United States Patent

Hashimoto et al.

[11] Patent Number: 6,095,013
[45] Date of Patent: Aug. 1, 2000

[54] CAM FOLLOWER APPARATUS

[75] Inventors: Kozo Hashimoto, Kokubunji; Toshiyasu Watanabe, Asaka, both of Japan

[73] Assignee: Koyo Seiko Co., Ltd., Osaka, Japan

[21] Appl. No.: 09/050,046

[22] Filed: Mar. 30, 1998

[30] Foreign Application Priority Data

Mar. 31, 1997 [JP] Japan ..................................... 9-098155

[51] Int. Cl.⁷ ..................................................... F01L 1/16
[52] U.S. Cl. ............................ 74/569; 384/625; 384/913; 123/90.51
[58] Field of Search ..................... 74/569, 567; 123/90.5, 123/90.42, 90.48, 90.51; 384/913, 625

[56] References Cited

U.S. PATENT DOCUMENTS 5,647,313  7/1997  Izumida et al. ...................... 123/90.51
5,816,207  10/1998  Kadokawa et al. .............. 123/90.51 X

FOREIGN PATENT DOCUMENTS 6-159371  6/1994  Japan .

OTHER PUBLICATIONS

English Abstract of JP 6–159371 which published on Jun. 7, 1994.

*Primary Examiner*—Mary Ann Battista
*Attorney, Agent, or Firm*—Birch, Stewart, Kolasch & Birch, LLP

[57] ABSTRACT

A cam follower apparatus includes at least a roller and a supporting shaft for supporting the roller freely rotatably. Unevenness is formed equally on the surface of at least one of the roller and supporting shaft by corrosion by manganese phosphate salt and the manganese phosphate salt film is formed on the corroded surface. Good-quality oil film can be formed stably without interruption thereof under even a strict working condition with a small amount of lubricant due to the unevenness formed on the film. Therefore, direct contact between metals is prevented, thereby improving lubricity.

3 Claims, 7 Drawing Sheets

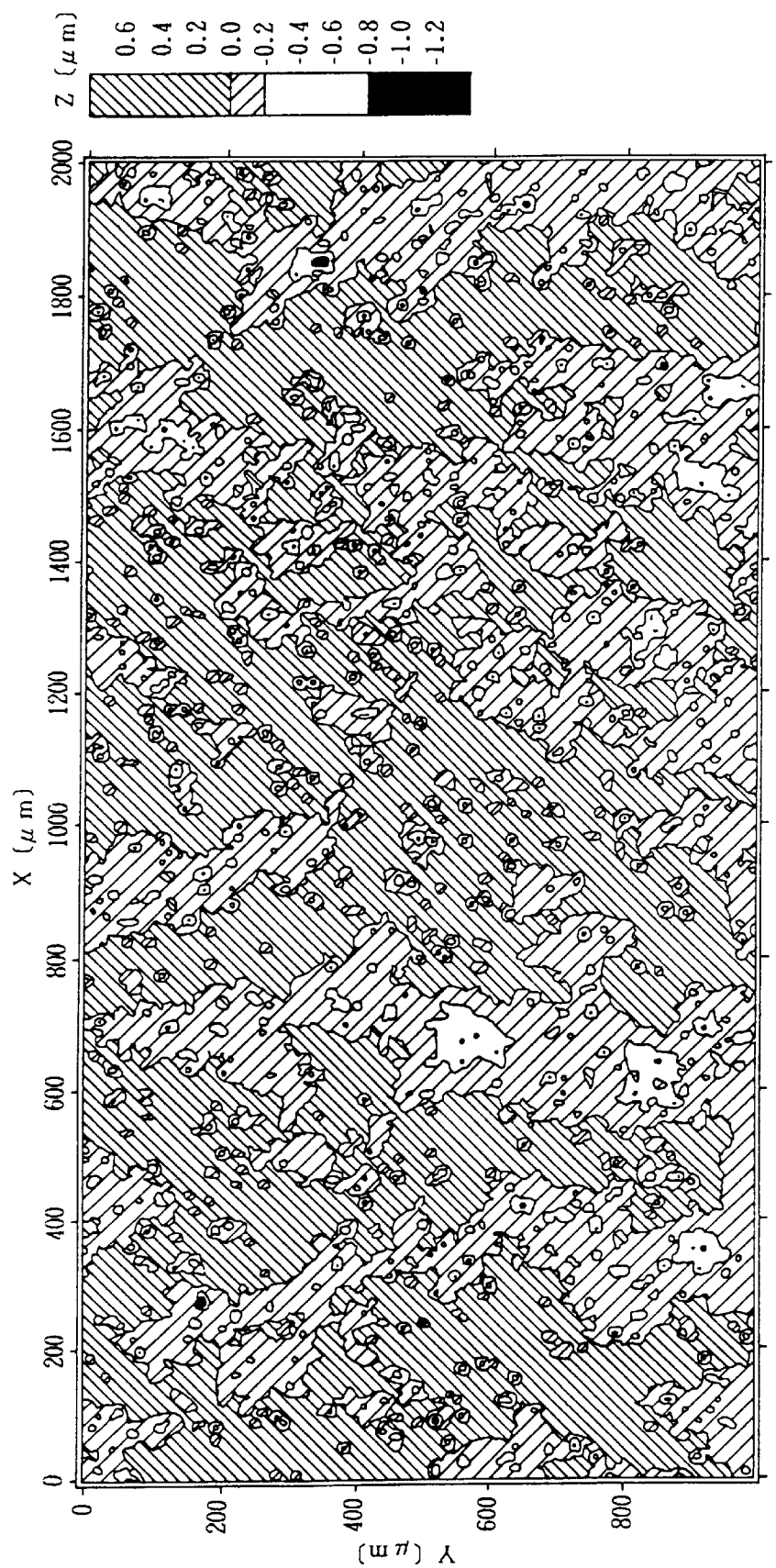
F I G. 4

CAM FOLLOWER APPARATUS

BACKGROUND OF THE INVENTION

1. Field of the Invention

This invention relates to a cam follower apparatus for use in a rocker arm or valve lifter of an engine valve actuating mechanism.

2. Description of the Related Art

In a cam follower apparatus having a structure in which a roller is supported rotatably relative to a supporting shaft, theoretically it comes that the roller is in a rolling contact with a cam. However, sometimes the roller becomes incapable of performing a pure rolling motion relative to the cam due to a change in rotation speed of the roller resulting from the shape of the cam or a sudden change of load applied on the bearing. Therefore, instead of pure rolling motion, a rolling contact is accompanied by sliding motion. In such a case, when the roller comes into sliding contact with the cam, heat is produced, so that wearing, damage and baking are produced easily. As a result, the cam follower apparatus wears prematurely. Therefore, improving lubrication between the roller and cam is very important in the engine valve actuating mechanism using this cam follower apparatus so that durability is improved and maintenance is reduced.

In diesel engines or the like, engine oil is deteriorated by blowby gas so that a combustion product such as soot is likely to be produced. When the above cam follower apparatus is used in a diesel engine or the like having such feature, the lubrication performance of the roller is considerably lowered by the combustion product such as soot, so that the aforementioned wearing, damage or baking occur prematurely.

SUMMARY OF THE INVENTION

Accordingly, an object of the present invention is to provide a cam follower apparatus capable of suppressing wearing, damage and baking thereof caused by rolling contact of a roller with sliding, thereby prolonging the service life of the same cam follower apparatus.

Other objects, features and advantages of the present invention will be evident from the following description.

To achieve the above object, the present invention provides a cam follower apparatus comprising a roller and a supporting shaft for supporting the roller freely rotatably, wherein an unevenness for lubricant sump is provided on at least one surface of the roller and supporting shaft and a surface thereof is covered with manganese phosphate salt film.

According to the present invention, good-quality oil film can be formed stably without interruption thereof on positions requiring it under even a strict working condition with a small amount of lubricant. As a result, direct contact between metals can be prevented thereby improving lubricity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects as well as advantages of the invention will become clear by the following description of preferred embodiments of the invention with reference to the accompanying drawings, wherein:

FIG. 4 is a surface roughness distribution diagram showing a roller surface after an experiment about a cam follower apparatus according to a preferred embodiment of the present invention;

In all these figures, like components are indicated by the same numerals.

DETAILED DESCRIPTION OF THE PREFERRED EMBODIMENTS

A cam follower apparatus according to a preferred embodiment of the present invention will be described in detail with reference to FIGS. 1–6. Before this description, the actuating system of the cam follower will be explained with reference to FIGS. 7, 8.

Figure 7:
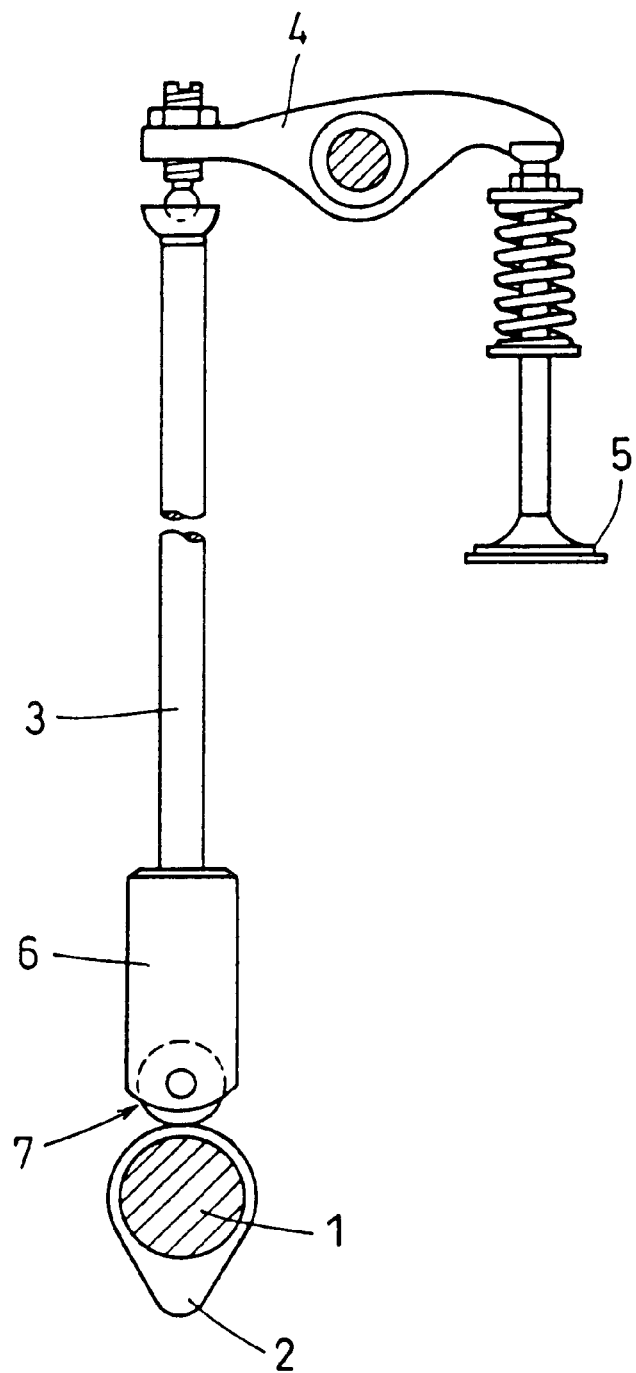
FIG. 7 is an explanatory view showing a style of the cam follower according to a preferred embodiment of the present invention.

In the valve actuating mechanism of the OHV type engine shown in FIG. 7, a cam 2 installed integrally rotatably on a cam shaft 1 carries a push rod 3 up and down. A rocker arm 4 interlocking with a top end of the push rod 3 rocks so as to open a valve 5. In the above mechanism, a valve lifter 6 is provided at a bottom end of the push rod 3 and a cam follower 7 according to a concrete example of this invention is installed on this valve lifter 6.

Figure 8:
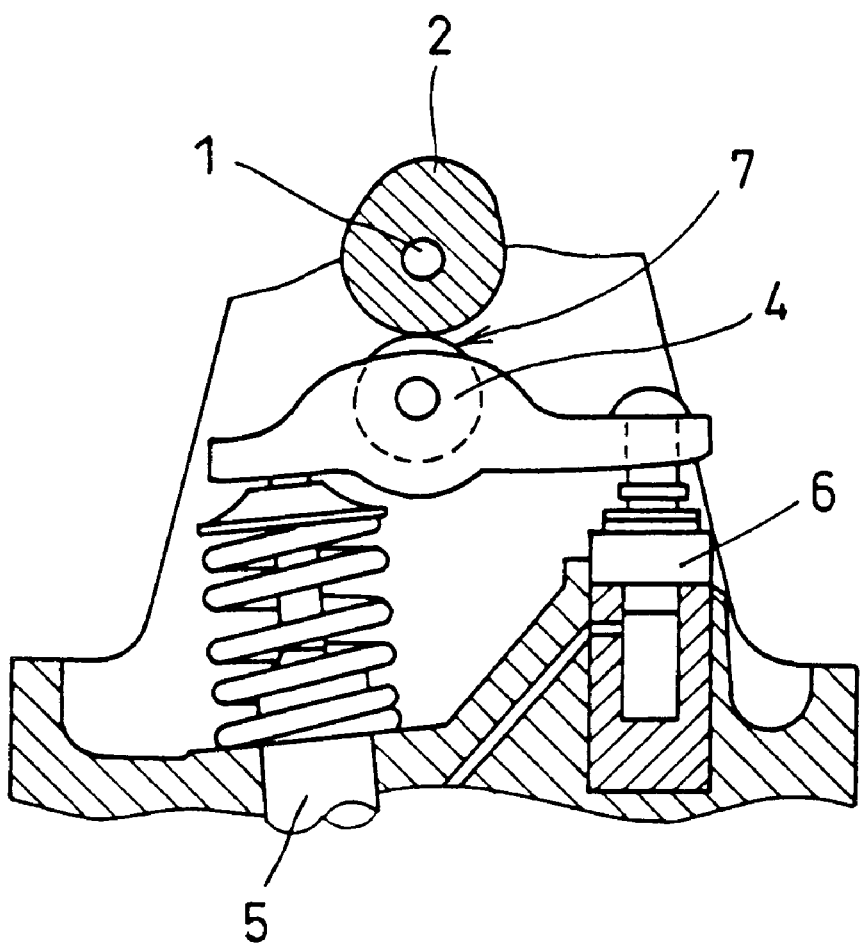
FIG. 8 is an explanatory view showing another style of the cam follower apparatus according to a preferred embodiment of the present invention.

In the valve actuating mechanism of the OHC type engine shown in FIG. 8, the rocker arm 4 is rocked by the cam 2 installed integrally rotatably on the cam shaft 1 so as to open/close the valve 5. In the above mechanism, the cam follower apparatus 7 according to a concrete example of the invention is installed on an end portion of the rocker arm 4.

Figure 1:
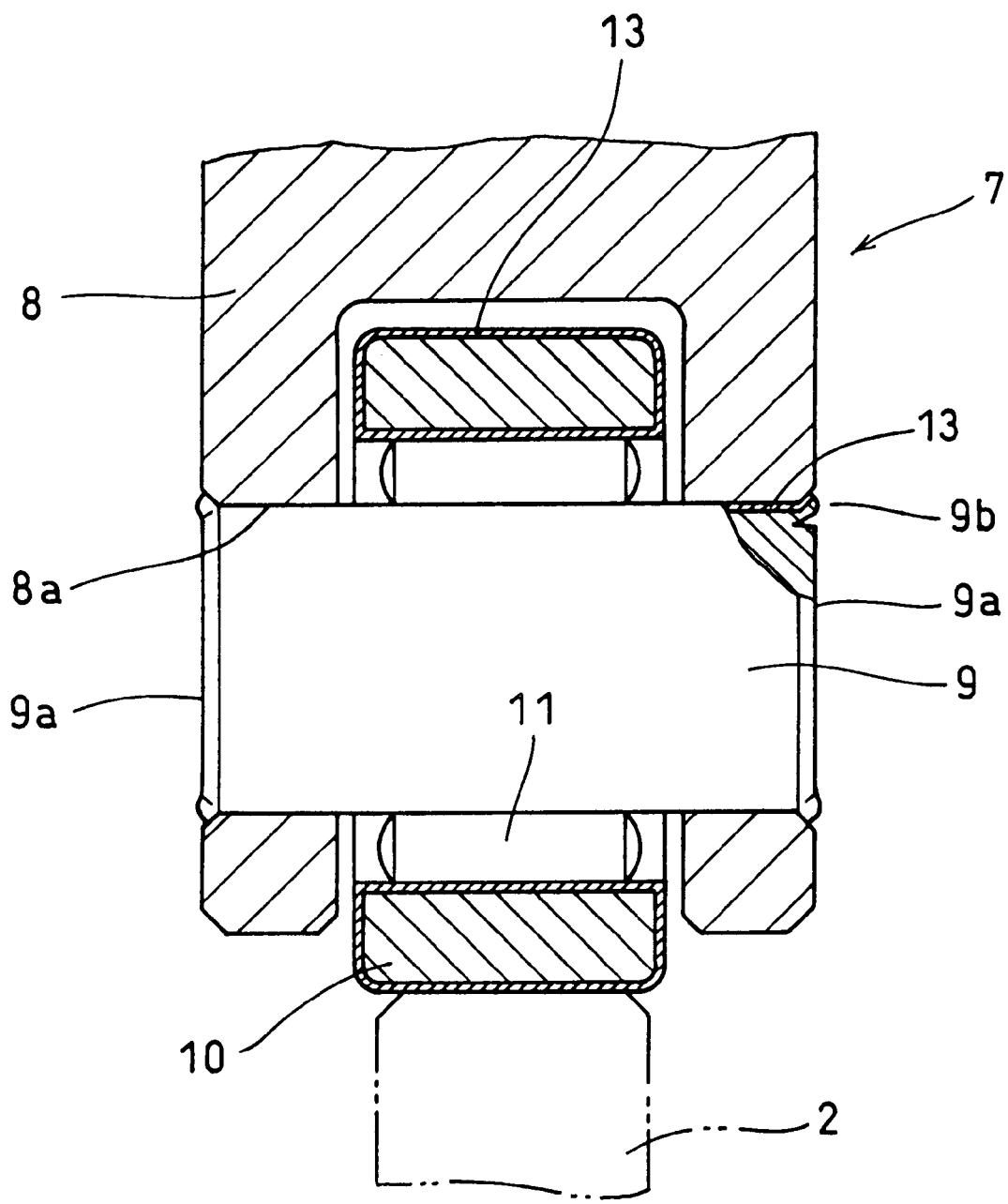
FIG. 1 is a longitudinal sectional view of a cam follower apparatus according to a preferred embodiment of the present invention.
Figure 2:
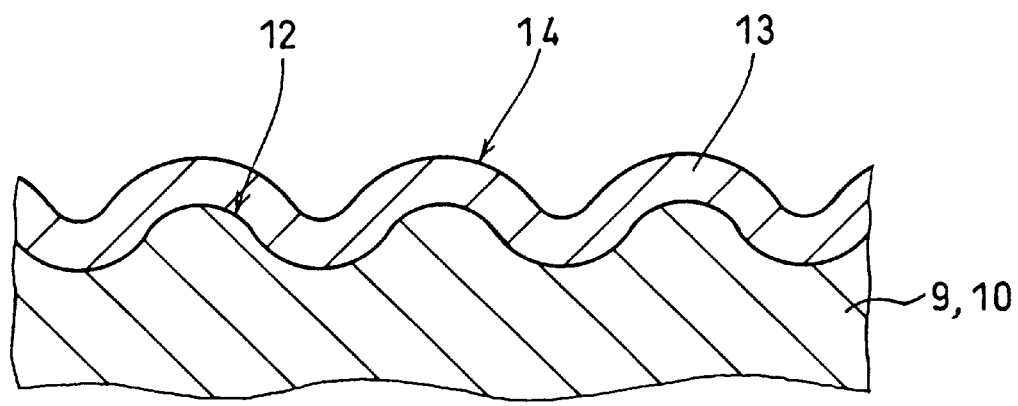
FIG. 2 is a sectional view showing schematically a surface of a supporting shaft and roller.

To install the aforementioned cam follower 7, bifurcated arms 8, 8 are formed at playing ends of the valve lifter 6 of FIG. 7 and the rocker arm 4 of FIG. 8, as shown in FIG. 1. The aforementioned cam follower apparatus 7 comprises a supporting shaft 9 provided between the arms 8 and 8 and a roller 10 supported by a plurality of needle-like rollers 11 freely rotatably with respect to the supporting shaft 9. Both ends of the supporting shaft 9 are inserted into shaft insertion holes 8a, 8a of the arms 8, 8. Circumferential portions 9b of both end faces 9a, 9a of the supporting shaft 9 are punched so as to be plastically deformed thereby achieving caulking. As a result, the supporting shaft 9 is held so that it is not loosen from the insertion holes 8a, 8a.

The aforementioned supporting shaft 9 is formed according to, for example, JIS standard SUJ-2 so that it is unlikely to be deformed by a load repeatedly applied by the cam shaft 1 through the roller 10, and subjected to hardening treatment by induction quenching except the both end portions.

The aforementioned roller 10 is formed of quenched steel treated by, for example, JIS standard SUJ-2, such as carburized steel SCr420H, SCM420H, SNCM220H, SNCM420H, SNCM815, SAE4320, SAE5120.

An external surface of the supporting shaft 9 and internal/external surfaces of the roller 10 have an unevenness 12 for a lubricant sump and are covered with a surface protecting film 13 made of manganese phosphate salt. The unevenness 12 and film 13 are formed as follows.

The external surface of the supporting shaft 9 and internal/external surfaces of the roller 10 are subjected to film forming treatment using a water solution of manganese phosphate salt compound. By such film forming treatment, the external surface of the supporting shaft 9 and internal/external surfaces of the roller 10 corrode from the manganese phosphate salt compound and separation of the manganese phosphate salt crystal occurs on the surface thereof. As a result, as described later with reference to FIG. 2, a fine shallow unevenness 12 is formed due to corrosion on the external surface of the supporting shaft 9 and internal/external surfaces of the roller 10. Further, the surface protecting film 13 made of manganese phosphate salt is formed on the entire surface thereof.

Although initial unevenness exists from faults in grinding at the time of production on the external surface of the supporting shaft 9 and internal/external surfaces of the roller 10 before the above film is formed, that unevenness is relatively large and maldistributed. Furthermore, there are deep stripe-like concavities included. If the above film formation treatment is carried out on the supporting shaft 9 and roller 10 having such unequal initial unevenness, that unequal initial unevenness is equalized by fine uniform unevenness formed by the aforementioned corrosion. Furthermore, the deep stripe-like concavities existing dispersely are cut and extinguished, so that the fine unevenness 12 is allocated uniformly. Thus, on the surface of the film 13 formed on such small unevenness 12 existing uniformly, shallow fine unevenness 14 is also formed almost uniformly.

As a result, the unevenness 12 is formed on the external surface of the supporting shaft 9 and the internal/external surfaces of the roller 10. Further the film 13 having the unevenness 14 is formed on the external surface of the supporting shaft 9 and the internal/ external surfaces of the roller 10. In the cam follower apparatus according to the embodiment of the present invention, the external surface of the supporting shaft 9 and the internal/external surfaces of the roller 10 are subjected to the aforementioned manganese phosphate salt filming treatment according to the conditions (1)–(5) below. These conditions (1)–(5) are determined depending on a relation between the size of the unevenness 12 formed and the thickness of the film 13.

(1) The area ratio (ratio between concavity in the measurement section region and the base material area) on the cross section of the roughness center line based on the least squares method shall be 30–40%. This is a limit condition for the size of the concavity in the unevenness 12.

(2) In the uneveness 12, the position of the roughness center line (depth) shall be 1 $\mu$m or less from the top surface.

(3) If in the uneveness 12, an opening of the concavity on the section of the roughness center line is approximated by a circle, an average diameter of the opening shall be 55 $\mu$m or less. This is a limit condition for the width of the concavity in the uneveness 12.

(4) The depth of the concavity in the unevenness 12 shall be more than 0.2 $\mu$m when the roughness center line is taken as standard (=0). This is a limit condition for the depth of the concavity in the uneveness 12.

(5) The thickness of the film 13 shall be 3–10 $\mu$m. This is a limit condition for the thickness of the film 13.

Figure 3:
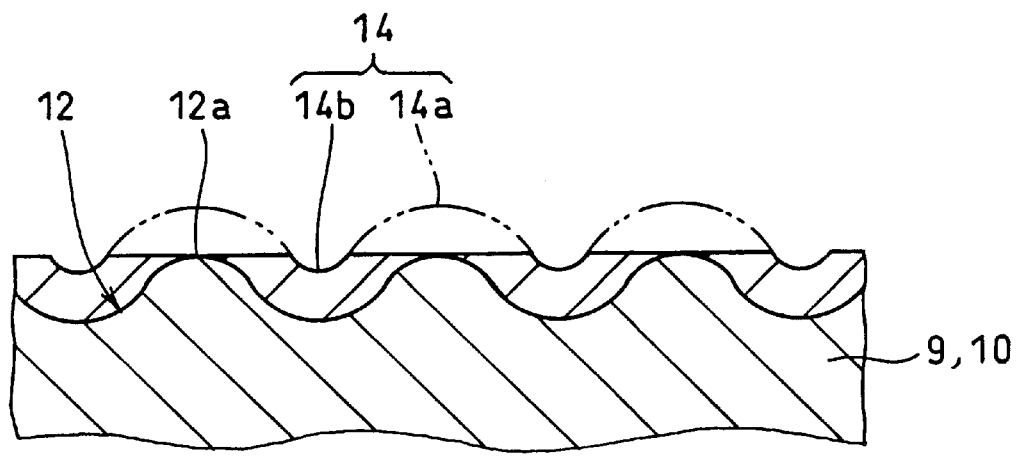
FIG. 3 is a sectional view showing schematically a surface of the supporting shaft and roller after a predetermined time has elapsed.

In the cam follower apparatus in which the unevenness 12 is formed and the film 13 is formed on the external surface of the supporting shaft 9 and the internal/ external surfaces of the roller 10, the following change is caused by its repeated operation as described later with reference to FIG. 3.

Because the surfacial film 13 formed by ordinary manganese phosphate salt filming treatment (e.g., see Japanese Unexamined Patent Application No.Hei6-159371) has some degree of lubricity, formation of the film 13 improves the initial conformability between the supporting shaft 9 and needle-like roller 11, supporting shaft 9 and arm 8, roller 10 and needle-like roller 11, and roller 10 and cam 2, thereby maintaining the lubricity of the initial operation stage.

If the operation is further continued, the surface is worn gradually because the film 13 is a film which wears easily. At this time, a convex portion 14$a$ of the uneveness 14 of the surface of the film 13 is selectively worn. As a result, top portions 12$a$ of the unevenness 12 existing on the external surface of the supporting shaft 9 and the internal/external surfaces of the roller 10 are exposed and thus the film 13 is worn until the wearing is stopped by the top portion 12$a$. Because the condition for manganese phosphate salt treatment (relation between the size of the unevenness 12 and thickness of the film 13) is set like the above (1)–(5), the film 13 existing in the concavity of the unevenness 12 remains. Therefore, the portion in the concavity 14$b$ of the uneveness 14 is not extinguished by grinding so that this portion exists after the film 13 is worn. A concave portion 14$b$ of the unevenness 14 left in this manner maintains lubricant excellently although it is ultrafine. Further, the concave portions 14$b$ having excellent maintenance of lubricant are allocated evenly on the external surface of the supporting shaft 9 and the internal/external surfaces of the roller 10. Thus, by holding the lubricant by the left concave portions 14$b$, an excellent lubricity can be maintained in the following operation, thereby securely preventing wearing, damage, and baking.

However, if the area ratio of the above condition (1) exceeds 40%, the concave portion 14$b$ of the unevenness 14 remaining is too large so that the lubricant holding capacity drops. Thus, wearing and peeling increases on the external surface of the supporting shaft 9 and the internal/external surfaces of the roller 10.

For reference, wearing of the surface measured in a sliding experiment between the roller 10 and cam 2 will now be described. In this experiment, a comparative example not subjected to manganese phosphate salt filming treatment and a concrete example of the present invention subjected to manganese phosphate salt filming treatment were used.

Figure 5:
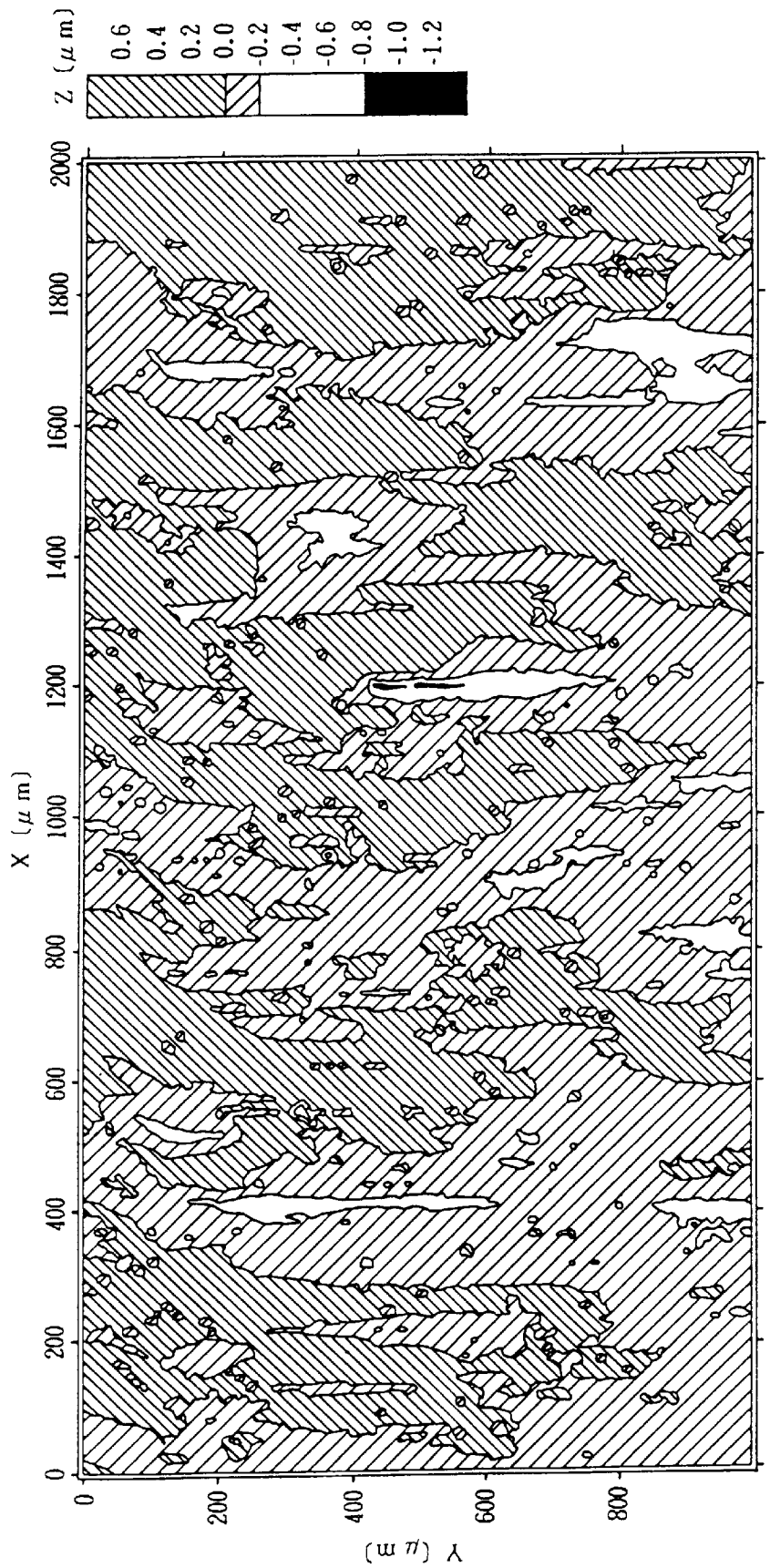
FIG. 5 is a surface roughness distribution diagram showing a roller surface after an experiment about a comparative example thereof.

As evident from a comparison of the surface roughness distribution diagram of the concrete example of the present invention shown in FIG. 4 with the surface roughness distribution diagram of the comparative example shown in FIG. 5, although there exists the unevenness in both cases, as for the comparative example shown in FIG. 5, the concave portions are left in long stripe shapes and the quantity thereof is small. On the contrary, as for the concrete example of the present invention, the concave portions of the unevenness are evenly left in dot-like manner and the quantity thereof is large. Thus, in the comparative example shown in FIG. 5, holding of lubricant by the entire surface is impossible so that the oil film formation is interrupted. Thus, direct contact between metals occurs so that wearing, damage and baking are likely to occur. On the other hand, in the concrete example of the present invention of FIG. 4, holding of lubricant by the entire surface becomes excellent, so that the oil film is formed on the entire surface without interruption by the held lubricant thereby protecting the metals from direct contact with each other.

Figure 6A:
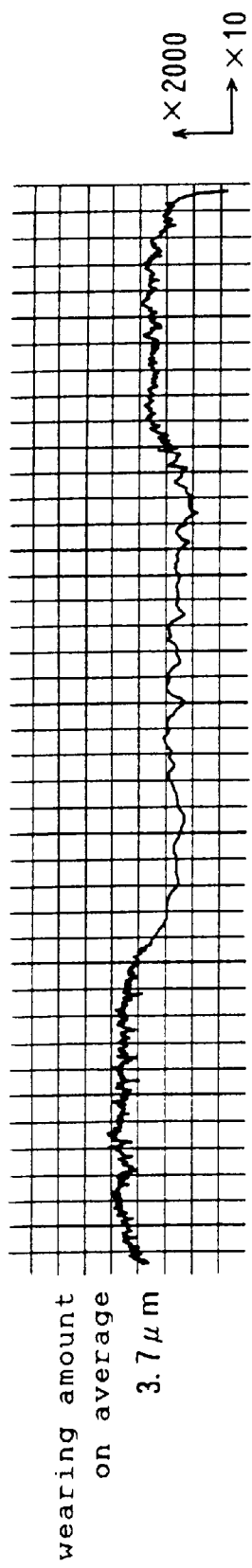
FIGS. 6A and 6B are graphs showing wear of a cam after the experiment.
Figure 6B:
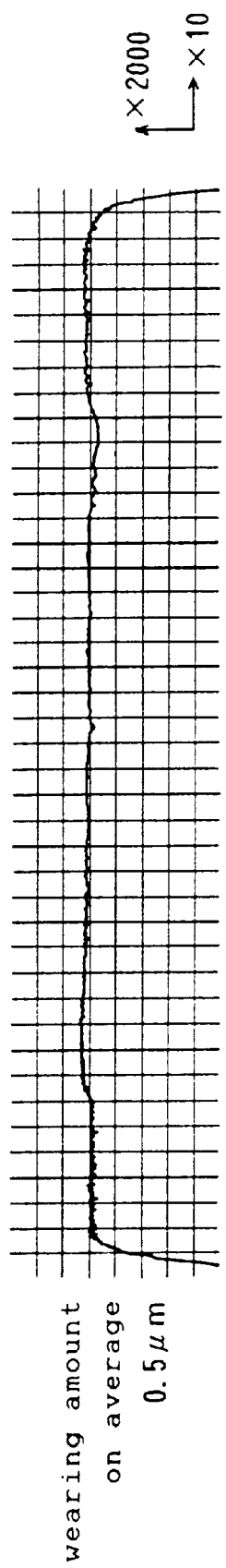

In the comparative example shown in FIG. 5, as shown in FIG. 6A, the wearing amount (depth) of the cam 2 is 3.7 μm on average. On the other hand, in the concrete example of the present invention of FIG. 4, as shown in FIG. 6B, the wearing amount (depth) of the cam 2 is 0.5 μm on average, thereby indicating that wear is largely reduced in the concrete example of the present invention as compared to the comparative example. Meanwhile, FIG. 6 shows measured surface roughness data magnified by 10 times along the transverse axis and by 2000 times on the ordinate axis. The actual machine operating condition before measurement is that the cam shaft rotation speed is 1,200 r/min, radial load is 11.8 KN and oil temperature is 130° C.

That is, although the film 13 covering the convex portion on the external surface of the supporting shaft 9 and internal/external surfaces of the roller 10 is partly peeled at a relatively early stage, the film 13 covering the concave portion of the unevenness 12 remains, and further the concave portion 14b remains also on the film 13 so that lubricant is held in this concave portion. Further, because the size (opening, depth) of the left concave portion 14b is relatively small, foreign matter (e.g., combustion product such as soot) mixed in lubricant does not remain in the concave portion 14b but is discharged quickly. Thus, good-quality lubricant remaining in the concave portion 14b always forms an oil film on the external surface of the supporting shaft 9 and the internal/external surfaces of the roller 10, so that not only direct contact between the roller 10 and cam 2 but also direct contact between the supporting shaft 9 and needle-like roller 11 can be prevented. Further, rolling contact motion with sliding of the needle-like roller 11 is smoothly supported for a long time. Therefore, wearing, damage and baking of the surface of the supporting shaft 9 and roller 10 can be suppressed for a long time.

Although in a diesel engine, deterioration of lubricant occurs early and lubricating condition is severe because combustion products such as soot are contained in the lubricant in a large quantity, application of the present invention contributes to improvement of lubricity.

The present invention is not restricted to only the aforementioned concrete example but various applications or modifications can be considered.

(1) Although in the above concrete example, manganese phosphate salt film is formed on both the supporting shaft 9 and roller 10, a case in which that film is formed on at least one of them is included in the present invention. At this time, the film made of manganese phosphate salt can be formed at least on the external surface of the roller 10 and the external surface of the supporting shaft 9 except the fixing portions to the arms 8, 8.

(2) Although the roller 10 is supported through the roller bearing (needle-like rollers 11) with respect to the supporting shaft 9, it is permissible to support it by sliding without the roller bearing.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A cam follower apparatus comprising:

a roller;

a roller bearing;

a shaft, said shaft supporting the roller in a freely rotatable manner; and wherein the surface of said roller is coated with a manganese phosphate salt film, said surface being changed to a form which includes uniformly concave parts, wherein the initial unevenness on the roller surface formed by machine processing is mutually independently constricted by the corrosive action of said film during the coating process, and convex parts having rounded tips, and said changed roller surface is coated with said film.

2. The cam follower apparatus according to claim 1 wherein said unevenness includes an area ratio on a cross section of the roughness center line of 30–40%, a position of the roughness center line is 1 μm or less from a top surface of the unevenness, an average diameter of the opening of a concavity in said unevenness on a section of said roughness center line is 55 μm or less, a depth of said concavity in said unevenness is more than 0.2 μm from said roughness center line, and the thickness of said film is 3–10 μm.

3. The cam follower apparatus according to claim 1, wherein said manganese phosphate salt film remains in the concave parts even after the convex parts on the roller surface dissipate by abrasion, said convex parts on the roller surface being exposed during use.

* * * * *